United States Patent Office 3,461,680
Patented Aug. 19, 1969

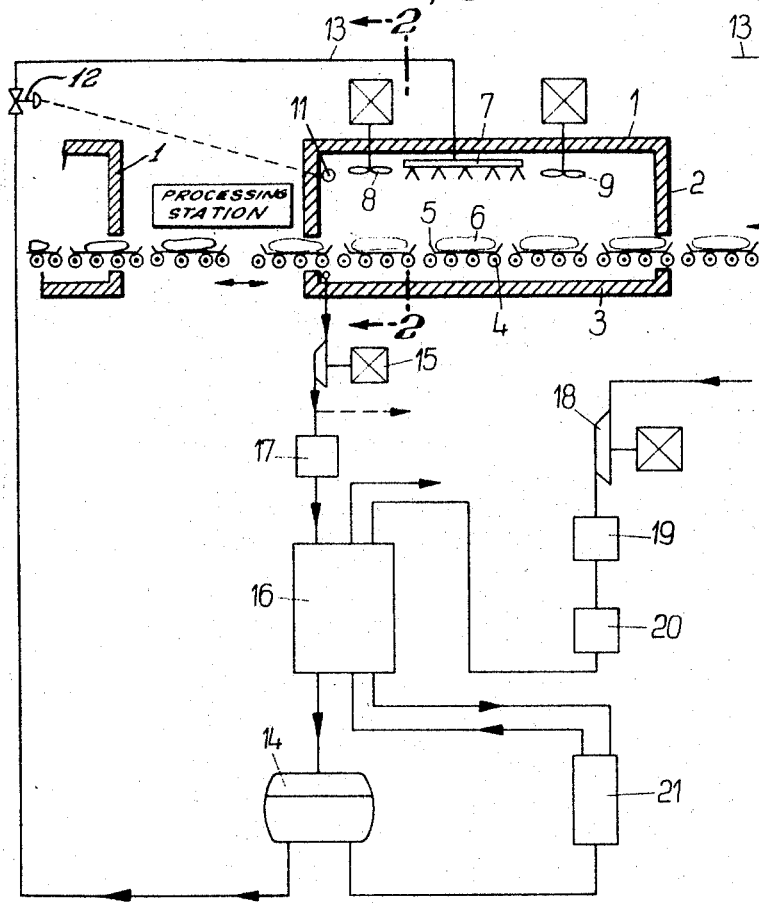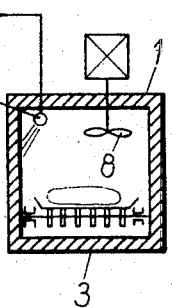

3,461,680
METHOD AND APPARATUS FOR REFRIGERATING FOODSTUFFS
Ernst A. Rische, Duisburg-Rahm, Germany, assignor to Messer Griesheim G.m.b.H., Frankfurt am Main, Germany, a corporation of Germany
Filed May 5, 1967, Ser. No. 636,375
Claims priority, application Germany, May 4, 1966, M 69,384
Int. Cl. F25d 13/06
U.S. Cl. 62—63         5 Claims

ABSTRACT OF THE DISCLOSURE

Refrigerating foodstuffs as they travel between adjacent food processing stations upon a conveyor. The conveyor is surrounded by an enclosure and liquid cooling agent is introduced into the enclosure by nozzle spraying to refrigerate the foodstuffs therein.

Background of the invention

The present invention relates to a method and apparatus for refrigerating foodstuffs, and more particularly to a method and apparatus where foodstuffs, such as meats, are maintained in a refrigerated condition above freezing during food processing operations.

In the processing of those foodstuffs refrigerated to avoid spoilage an undesirable warming up of the food takes place when it is exposed to the unrefrigerated atmosphere in the food processing rooms. In these rooms the exterior layer of the food is usually undesirably heated to the temperature of the room or in other words at least 12 to 14° C. A further warmth influx takes place in sealing the plastic foil which is often used today for packaging. Thus, spoilage sets in because of the warming of the outer layers of the previously chilled foods.

When fresh meat to be processed comes from the refrigerated storage area it is conveyed to a processing area at a temperature of about 0 to 2° C. The processing operations consist of the removal of bones from the meat, sectioning the meat into portions, placing the meat into containers or paper plates, for example, sealing the plastic foil overwrap, weighing the package and gluing the price and weight sticker on the package. The enumerated work procedures require up to 1½ hours in processing rooms where a temperature of 12°–14° C. prevails. During this stay the temperature of the surface layers of the refrigerated meat usually increases about 5° to 8° C.

Accordingly, it is an object of the present invention to avoid the damaging warming of the foodstuffs which is achieved according to the invention in that in the processing of the foodstuffs in areas at about room temperature there takes place between the individual food processing stations a re-cooling of the warmed up food in the area of a conveying device for transporting the foods from one station to the next.

Summary of the invention

In an advantageous development of the invention, the cooling of foodstuffs occurs in a tunnel or enclosure by spraying a liquid cooling agent, for example, liquid nitrogen or liquid air, into the tunnel. In this connection, the most uniform spraying is desired so that individual droplets of the cooling agent do not come in contact with the surface of the foodstuff and thereby cause spot freezing of the food. A freezing at individual spots is considered a freezing process so that even in this instance foodstuffs such as meat can no longer be sold as fresh. Thus, it is important in this procedure that there be no freezing of the chilled foodstuffs since in meat products, for example, a distinction is made between refrigerated and frozen meat. Frozen meat has a considerably lower quality and sells for a lower price.

The vaporized and heated cooling agent can be removed from the enclosure and liquefied again by a refrigeration machine for low temperatures. In cooling with liquid air of liquid nitrogen and in using a refrigeration machine for the reliquefaction, small amounts of air corresponding to the amount of gas lost through leakage can be freed of carbon dioxide and atmospheric moisture. In cooling with liquid nitrogen and operating a refrigerating machine for reliquefaction, only the nitrogen lost through leakage need be replaced by liquefaction of a corresponding amount of air in the refrigeration machine and subsequent separation in a small air separation plant.

Because of the high heat absorption of the low-temperature fixed gas small gas amounts are required for cooling and the drying of the cooling agent is almost completely avoided. In the use of liquid cooling agents inert with respect to the refrigerated foods, for example, liquid nitrogen, the oxidation of fats, flavoring agents and the like is also avoided because of the absence of atmospheric oxygen.

A suitable device for carrying out the process of the present invention consists advantageously in that the conveying device for the transporting of foodstuffs from one food processing station to the next is enclosed by a cooling tunnel including an insulated hood and an insulated base plate. In the cooling tunnel nozzle tubes are arranged for finely spraying the liquid cooling agent into the tunnel. The nozzle openings can be directed toward the wall of the cooling tunnel. Within the tunnel, fans can be provided for circulating the cooling agent. A thermometer probe is also provided in the cooling tunnel for accurately regulating the amount of liquid cooling agent sprayed into the tunnel. The thermometer operates in conjunction with a regulator so that the amount of gas introduced into the enclosure is such to maintain the atmosphere within the enclosure at a predetermined temperature above freezing. Refrigeration machines can be joined to the cooling tunnel for the reliquefaction of the utilized cooling agent as well as the amount of cooling agent equal to the amount lost due to leakage.

Brief description of the drawing

Novel features and advantages of the present invention in addition to those mentioned above will become apparent to one skilled in the art from a reading of the following detailed description in conjunction with the accompanying drawing wherein similar reference characters refer to similar parts and in which:

FIGURE 1 is a diagrammatic view of an apparatus according to the present invention; and FIGURE 2 is a sectional view taken along line 2—2 of FIGURE 1.

Detailed description of the invention

Referring in more particularity to the drawing, FIGURE 1 illustrates diagrammatically a food packaging plant for processing foodstuffs, such as fresh meat for example. A cooling tunnel or enclosure 1 is provided for refrigerating the fresh meat as it travels between individual food processing stations. The enclosure comprises a hood 2 and a base plate 3. As shown in the drawing, the belt of a conveyor arrangement 4 runs through the enclosure and meat 6 is supported on plates 5 of the conveyor. In the upper portion of the hood 2 a spray nozzle tube 7 is provided for nozzle spraying liquid cooling agent from tank 14 through insulated conduit 13 into the enclosure. The sprayed liquid cooling agent is circulated within the enclosure by a pair of fans 8, 9 secured to the upper portion of the hood.

A temperature sensing device 11 is also provided within the enclosure for controlling the temperature of the atmosphere within the enclosure. The temperature sensing device may be a thermometer probe attached to a valve mechanism 12 by means of a control device (not shown). The valve mechanism regulates the amount of cooling agent introduced into the enclosure. Thus, the temperature sensing device 11 together with the control device (not shown) and the valve mechanism 12 function to maintain the temperature within the enclosure at a predetermined level by regulating the amount of cooling agent introduced into the enclosure.

A low temperature refrigeration machine 16 required for the reliquefaction of the cooling agent has a dryer 17 connected to it in series. The spent cooling agent removed from the tunnel is reliquefied in this machine. The amount of gas lost because of leakage in the tunnel can be replaced by an amount of liquid cooling agent corresponding to these losses. For example, liquid nitrogen is produced in a small separating apparatus connected with the above described refrigeration machine 16. The air necessary to replace the lost cooling agent is drawn from compressor 18 by way of dryer 19. After the carbon dioxide is removed by device 20 the air is fed to the refrigeration machine 16 where liquefaction takes place.

The liquid air, in cases where it acts as the cooling agent, is conducted to tank 14. When liquid nitrogen serves as the cooling agent, the air is conducted to the separating apparatus 21. In the separation apparatus 21 liquid nitrogen is separated from the liquid air. The liquid nitrogen flows to the tank 14 and gaseous oxygen, after utilization of its cold in the refrigeration device 16, goes into the open or is utilized in a suitable manner.

The proposed control makes it possible to advantageously keep the cold losses low in that the residual cold of the gas leaving the cooling tunnel is utilized. Accordingly, the separation device can be small, since only the lost nitrogen must be produced with it. Because of its low temperature, the moisture load of the gas leaving the tunnel is very small so that the dryer 19 can be small. Furthermore, the gas leaving the tunnel is free of carbon dioxide whereby the device and the energy expenditure for its separation become superfluous.

Alternatively, the air separation apparatus can be eliminated and the storage tank 14 dimensioned large enough to cover losses due to leakage. In cooling or freezing with liquid air the nitrogen-separation device is not needed.

Of course it is not only the example of operation described above and illustrated in the drawing which falls into the frame of this invention. There are furthermore numerous application possibilities in the construction of the plant and in the arrangement of the individual parts without thereby deviating from the scope of this invention.

What is claimed is:

1. A method for maintaining refrigerated unpackaged foodstuffs within a desired temperature range as the foodstuffs travel between the food processing stations of a series upon an enclosed conveyor system that interconnects the series of processing stations comprising conveying refrigerated foodstuffs to one of the food processing stations for treatment, thereafter conveying the treated foodstuffs to the next food processing station of the series, and introducing by nozzle spraying a liquid inert cooling agent into the enclosed conveyor system in amounts sufficient to maintain the refrigerated foodstuffs within the desired temperature range without freezing the foodstuffs and whereby oxidation of the foodstuffs is avoided with the liquid cooling agent being directed in such a manner so as not to come into direct contact with the foodstuffs.

2. A method as in claim 1 including the steps of removing utilized cooling agent from the enclosed conveyor system, condensing the removed cooling agent, adding additional cooling agent to the removed and condensed cooling agent to replace cooling agent lost through leakage prior to recycling the condensed cooling agent into the enclosed conveyor system, and the cooling agent being liquid nitrogen.

3. A method as in claim 2 including the step of producing the additional cooling agent by compressing an amount of air sufficient to produce an amount of liquid nitrogen substantially equal to the amount lost through leakage, liquefying the compressed air and separating the liquid nitrogen component from the liquid air.

4. An apparatus for maintaining refrigerated unpackaged foodstuffs within a desired temperature range as the foodstuffs travel between the food processing stations of a series comprising a conveyor system that runs between the individual food processing stations of the series, enclosure means surrounding the conveyor system between adjacent food processing stations, nozzle spray means within the enclosure means for spraying a liquid inert cooling agent into the enclosure means whereby oxidation of the foodstuffs is avoided, said nozzle spray means being disposed with respect to said conveyor system for directing the liquid cooling agent without coming into direct contact with the foodstuffs whereby the foodstuffs remain unfrozen, and control means for controlling the amount of liquid cooling agent sprayed into the enclosure means whereby the refrigerated foodstuffs are maintained within the desired temperature range as they travel between the food processing stations of the series.

5. An apparatus for maintaining refrigerated foodstuffs within a desired temperature range as the foodstuffs travel between the food processing stations of a series comprising a conveyor system that runs between the individual food processing stations of the series, enclosure means surrounding the conveyor system between adjacent food processing stations, nozzle spray means within the enclosure means for spraying a liquid cooling agent into the enclosure means, and control means for controlling the amount of liquid cooling agent sprayed into the enclosure means whereby the refrigerated foodstuffs are maintained within the desired temperature range as they travel between the food processing stations of the series, the nozzle means being directed toward the walls of the enclosure means.

References Cited

UNITED STATES PATENTS

| 2,484,297 | 10/1949 | Klein | 62—330 |
|---|---|---|---|
| 2,951,353 | 9/1960 | Morrison | 62—375 |
| 3,255,599 | 6/1966 | Morrison | 62—64 X |
| 3,302,423 | 2/1967 | Morrison | 62—374 X |
| 3,277,657 | 10/1966 | Harper et al. | 62—63 |
| 3,315,480 | 4/1967 | Rich | 62—63 |
| 3,048,989 | 8/1962 | Morrison | 62—64 X |
| 3,255,597 | 6/1966 | Carter | 62—239 |
| 3,360,384 | 12/1967 | Kurzinski et al. | 99—192 |

WILLIAM E. WAYNER, Primary Examiner

U.S. Cl. X.R.

62—78; 99—197